(12) United States Patent
Seifert et al.

(10) Patent No.: US 10,138,870 B2
(45) Date of Patent: Nov. 27, 2018

(54) METHOD AND SYSTEM OF PROVIDING FLUID FLOW FOR A ROTOR

(75) Inventors: Avraham Seifert, Tel-Aviv (IL); Maor Hai Avnaim, Moshav Beit-Gamliel (IL)

(73) Assignee: Ramot at Tel-Aviv University Ltd., Tel-Aviv (IL)

(*) Notice: Subject to any disclaimer, the term of this patent is extended or adjusted under 35 U.S.C. 154(b) by 808 days.

(21) Appl. No.: 13/992,774

(22) PCT Filed: Dec. 8, 2011

(86) PCT No.: PCT/IL2011/050051
§ 371 (c)(1),
(2), (4) Date: Jun. 10, 2013

(87) PCT Pub. No.: WO2012/077118
PCT Pub. Date: Jun. 14, 2012

(65) Prior Publication Data
US 2013/0259642 A1 Oct. 3, 2013

Related U.S. Application Data

(60) Provisional application No. 61/421,230, filed on Dec. 9, 2010.

(51) Int. Cl.
*F03D 15/00* (2016.01)
*F03D 3/06* (2006.01)
*B64C 21/04* (2006.01)
*B64C 23/06* (2006.01)
*F03D 1/06* (2006.01)
*F03D 80/00* (2016.01)

(52) U.S. Cl.
CPC ............. *F03D 3/061* (2013.01); *B64C 21/04* (2013.01); *B64C 23/065* (2013.01);
(Continued)

(58) Field of Classification Search
CPC ... F03D 1/04; F03D 1/06; F03D 1/065; F03D 3/062; F03D 9/00; F03D 11/02
(Continued)

(56) References Cited

U.S. PATENT DOCUMENTS 7,354,247 B2* 4/2008 Bonnet ................. F03D 1/0633
  415/905
7,387,491 B2* 6/2008 Saddoughi ............ F03D 1/0608
  415/914

(Continued)

FOREIGN PATENT DOCUMENTS

DE 3527951 2/1987
EP 1335130 8/2003
(Continued)

OTHER PUBLICATIONS

International Search Report and the Written Opinion dated Jul. 4, 2012 From the International Searching Authority Re. Application No. PCT/IL2011/050051.

*Primary Examiner* — Jason Shanske
*Assistant Examiner* — Sabbir Hasan (57) ABSTRACT

A rotor which comprises at least one blade and at least one fluid routing device that is mechanically connected to one of the blades so that a fluid inlet thereof is placed in a lateral edge of the blade. The fluid routing device has a continuous channel with an inlet facing the opposite direction of rotation of the blades and an outlet. The continuous channel is sized and shaped to conduct fluid passing via the inlet. The fluid routing device includes a flow directing element that is mechanically connected to the outlet so as to direct the conducted fluid to adjust fluid flow in or on the mechanically connected blade.

12 Claims, 5 Drawing Sheets

(52) U.S. Cl.
CPC ......... *F03D 1/0633* (2013.01); *F03D 1/0675* (2013.01); *F03D 3/062* (2013.01); *F03D 15/05* (2016.05); *F03D 80/00* (2016.05); *F05B 2240/122* (2013.01); *F05B 2240/123* (2013.01); *F05B 2240/20* (2013.01); *F05B 2260/601* (2013.01); *Y02E 10/721* (2013.01); *Y02E 10/74* (2013.01); *Y02T 50/164* (2013.01); *Y02T 50/166* (2013.01)

(58) Field of Classification Search
USPC ..................................... 416/90 R, 95, 146 R
See application file for complete search history.

(56) References Cited

U.S. PATENT DOCUMENTS

| | | | | |
|---|---|---|---|---|
| 2007/0095987 | A1 | 5/2007 | Glezer et al. | |
| 2007/0116567 | A1* | 5/2007 | Luetze | F03D 11/022 416/97 R |
| 2007/0152104 | A1 | 7/2007 | Cueman et al. | |
| 2008/0317598 | A1* | 12/2008 | Barbu | F03D 7/022 416/9 |
| 2009/0060748 | A1* | 3/2009 | Landa | F03D 11/00 416/93 R |
| 2010/0028149 | A1 | 2/2010 | Li et al. | |
| 2010/0076614 | A1* | 3/2010 | Nies | F03D 11/00 700/287 |
| 2010/0135794 | A1* | 6/2010 | Nies | F03D 11/0016 416/1 |
| 2010/0135795 | A1* | 6/2010 | Nies | F03D 7/042 416/1 |
| 2010/0143123 | A1* | 6/2010 | Haans | F03D 1/0608 416/1 |

FOREIGN PATENT DOCUMENTS

| | | |
|---|---|---|
| WO | WO 03/025393 | 3/2003 |
| WO | WO 2012/077118 | 6/2012 |

* cited by examiner

METHOD AND SYSTEM OF PROVIDING FLUID FLOW FOR A ROTOR

RELATED APPLICATIONS

This application is a National Phase of PCT Patent Application No. PCT/IL2011/050051 having International filing date of Dec. 8, 2011, which claims the benefit of priority under 35 USC § 119(e) of U.S. Provisional Patent Application No. 61/421,230 filed on Dec. 9, 2010. The contents of the above applications are all incorporated by reference as if fully set forth herein in their entirety.

FIELD AND BACKGROUND OF THE INVENTION

The present invention, in some embodiments thereof, relates to flowing fluids on aerodynamic or hydrodynamic surfaces and, more particularly, but not exclusively, to flowing fluids on aerodynamic surfaces or hydrodynamic surfaces of a blade of a rotary machinery, such as helicopter or wind turbine.

Several methods are known in the art for actively manipulating fluid flow over a surface. One method widely used employs active flow control to increase turbulence, and more specifically certain relevant scales of turbulence, on the aerodynamic surfaces, for example by use of synthetic jet actuators.

For example, US 2007/0095987 to Glezer et al. discloses a synthetic jet actuator including a jet housing that incorporates an internal chamber with a volume of fluid and a small orifice in one dimension of the chamber connecting the internal chamber to an external environment having the fluid to be controlled. The synthetic jet actuator disclosed is operative to periodically change the volume within the internal chamber such that a synthetic jet stream entrained by a series of fluid vortices is generated and projected to the external environment.

US 2007/152104 to Cueman et al., for example discloses an array of synthetic jet actuators integrated in various applications, such as in aircraft engines or wings. Each actuator includes a chamber, a flow control port (a small orifice in one dimension of the chamber) and opposite parallel side walls configured to expand apart and contract together to flow a control fluid through the flow control port in response to an input.

Another example is described in U.S. Provisional Patent Application No. 61/288,386 filed on Dec. 21, 2009, which describes an oscillatory vorticity generator device for controlling the flow on an aero- or hydrodynamic surface of an element. The oscillatory vorticity generator device comprises two main walls, positioned opposite to each other, forming a first pair of walls and two other walls, the four walls each having proximal and distal ends, the distal ends connected to an aero- or hydrodynamic surface, a connection connecting the walls at their proximal ends, and an opening in the aero- or hydrodynamic surface, the opening being substantially contiguous with the two main walls and the two other walls.

SUMMARY OF THE INVENTION

According to some embodiments of the present invention there is provided a rotor that comprises a plurality of blades and at least one fluid routing device, each mechanically connected to one of the plurality of blades and comprises: a continuous channel with an inlet facing the opposite direction of rotation of the plurality of blades and an outlet, the continuous channel being sized and shaped to conduct fluid passing via the inlet and so that the inlet being placed in a lateral edge of the blade, and a flow directing element mechanically connected to the outlet so as to direct the conducted fluid to adjust a fluid flow in or on the mechanically connected blade.

Optionally, the continuous channel is sized and shaped to conduct the passing fluid.

Optionally, the continuous channel is bended so as to alter the static pressure of the conducted fluid.

Optionally, the flow directing element directs the conducted fluid toward the mechanically connected blade.

Optionally, the flow directing element directs the conducted fluid to apply suction pressure on fluid in the mechanically connected blade.

Optionally, the flow directing element directs the conducted fluid to a longitudinal axis of the respective blade.

Optionally, the rotor is a vertical axis wind turbine (VAWT) and the at least one fluid routing device being mechanically connected to at least one of a top lateral edge and a low lateral edge.

Optionally, the flow directing element directs the conducted fluid into a duct inside the respective blade.

Optionally, the flow directing element directs the conducted fluid to support a pumping mechanism of the rotor.

According to some embodiments of the present invention there is provided a fluid routing device for providing conducted fluid to a blade. The fluid routing device comprises a continuous channel with an inlet and an outlet, the continuous channel being sized and shaped to conduct fluid passing via the inlet, a blade attachment element for attaching the fluid routing device to a blade of a rotor having a plurality of blades so that the inlet being placed in a lateral edge of the blade, facing the opposite direction of rotation of the plurality of blades, and a flow directing element connected to the outlet so as to direct the conducted fluid to adjust fluid flow in or on the blade.

Optionally, the continuous channel comprises a first tubular member defining a first fluid channel originating from the inlet, a second tubular member defining a second fluid channel terminating at the outlet, and a bend connector which connects between the first and second fluid channels so as to form a continuous fluid channel therealong and an acute angle therebetween for conducting fluid passing via the inlet.

Optionally, the flow directing element directs the conducted fluid to a longitudinal axis of the blade.

Optionally, the device does not have any moving parts.

According to some embodiments of the present invention there is provided a method of flowing conducted fluid in a system having a rotor with a plurality of blades. The method comprises attaching a fluid routing device having a continuous fluid channel with an inlet to a blade of a rotor having a plurality of blades so that the inlet being placed in a lateral edge of the blade and facing the opposite direction of rotation of the plurality of blades, altering the static pressure of fluid conducted via the inlet in the continuous fluid channel, and directing the pressure altered fluid for adjusting fluid flow in or on the blade.

Optionally, the method further comprises cooling the blade using the directed pressure altered fluid.

Optionally, the method further comprises controlling fluid flow around the blade using the directed compressed fluid.

Optionally, the method further comprises cleaning the blade using the directed compressed fluid.

Optionally, the method further comprises increasing vorticity transport of the blade using the directed compressed fluid.

Optionally, the method further comprises heating the blade using the directed pressure altered fluid.

According to some embodiments of the present invention there is provided a rotor which comprises a plurality of blades and at least one fluid routing device, each mechanically connected to one of the plurality of blades and comprises: a continuous channel with an inlet, placed in a lateral edge of a respective the blade and facing the opposite direction of rotation of the plurality of blades and an outlet, the continuous channel being sized and shaped to route fluid passing via the inlet so as to form a sub-ambient pressure at the lateral edge which attracts fluids from at least one of a lumen in the blade and the surface of the blade.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to flowing fluids on aerodynamic or hydrodynamic surfaces and, more particularly, but not exclusively, to flowing fluids on aerodynamic surfaces or hydrodynamic surfaces of a blade of a rotary machinery, such as blades having one or more airfoils, for example of a helicopter or a wind turbine blade.

According to some embodiments of the present invention, there is provided a rotor, such as a rotor of a wind turbine or a gas turbine, which comprises a plurality of blades and one or more fluid routing devices, each mechanically connected to one of the blades so that a fluid inlet thereof is placed in a lateral edge of the blade. The fluid routing device has a continuous channel, optionally bended, with an inlet facing the opposite direction of rotation of the blades and an outlet. The bended continuous channel is sized and shaped to enable fluid passing via the inlet. The fluid routing device includes a flow directing element that is mechanically connected to the outlet so as to direct the conducted, optionally static pressure altered fluid, such as compressed fluid, to adjust the fluid flow in or on said mechanically connected blade, for example for cleaning, cooling, heating, applying suction force, support an existing pumping mechanism that is either located on one or more of the blades and/or the hub of the rotor and/or flow control. The directing is optionally toward the mechanically connected blade. The routed, or re routed, air may be directed to flow in a duct in the blade and/or on the surface of the blade. Alternatively, an ejector could be located at the tip to exhale fluid out of the rotor or wing. Alternatively, the wind tip device (inlet or ejector) contains a directing device to optimally position it opposite to the incoming flow.

According to some embodiments of the present invention, there is provided a fluid routing device for providing pressure altered fluid to a blade. The fluid routing device may be provided as an add-on to existing rotors and/or installed during the manufacture of a blade. The fluid routing device comprises a bended and continuous channel which is sized and shaped to alter the static pressure of fluid passing via an inlet there and a blade attachment element for attaching the fluid routing device to a blade of a rotor so that the inlet is placed in a tip (lateral edge) of the blade, facing the opposite direction of rotation of the rotor. The fluid routing device further includes a flow directing element that is connected to the outlet so as to direct the fluid to adjust fluid flow in and/or on the blade, for example for cleaning and/or cooling and/or for flow control.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1:
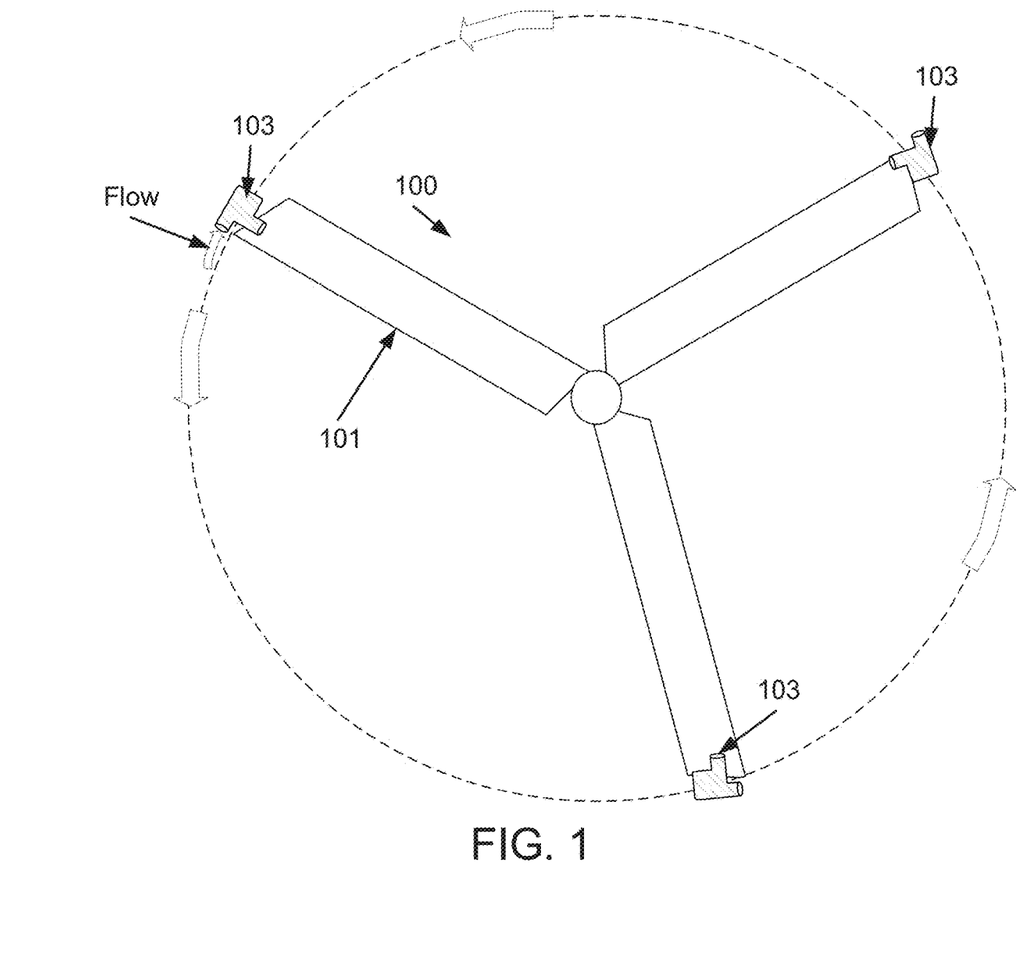
FIG. 1 is an exemplary rotor (propeller) having a plurality of rotating blades (wings) and one or more fluid routing devices, according to some embodiments of the present invention.
Figure 2:
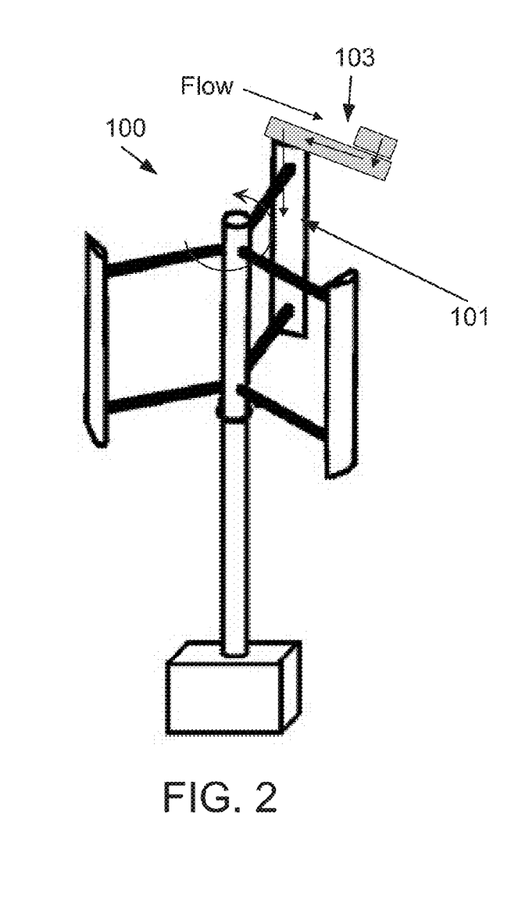
FIG. 2 is an exemplary vertical axis wind turbine (VAWT) having an exemplary fluid routing device connected to its tip (lateral edge), according to some embodiments of the present invention.
Figure 3:
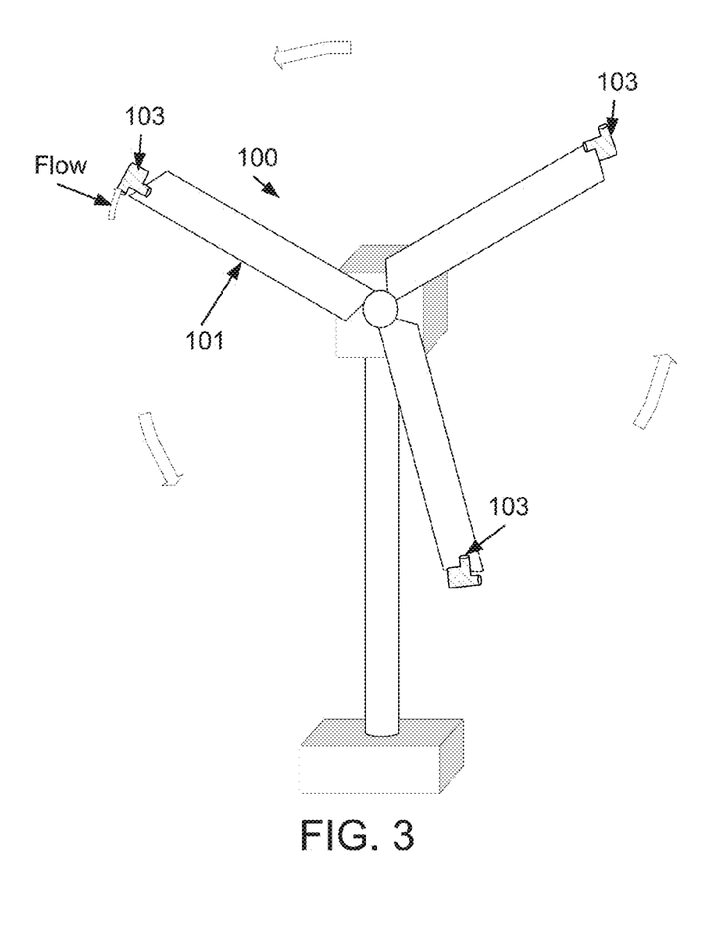
FIG. 3 is an exemplary horizontal axis wind turbine (VAWT) having an exemplary fluid routing device connected to its lateral edge, according to some embodiments of the present invention.

Reference is now made to FIG. 1, which is an exemplary rotor 100 having a plurality of rotating blades 101, such as blades, rotating in a rotation plane 102, and one or more fluid routing devices 103, each attached to another blade, according to some embodiments of the present invention. Each blade may have one or more airfoils Each one of the fluid routing devices 103 has a fluid channel which is shaped to conduct, and optionally to alter the static pressure of air flowing via an inlet that faces the opposite rotation direction of the rotating blades 101. Each fluid routing device 103 is arranged in a manner that the inlet is placed on a lateral edge of one of the blades, referred to herein as a hosting blade. Each fluid routing device 103 is mounted on the hosting blade to direct the conducted air to the hosting blade 101. In such a manner, the conducted fluid may be used for increasing vorticity transport on the hosting blade 101, cleaning the hosting blade 101, cooling the hosting blade 101, supporting an existing pumping mechanism at the hub of the rotor and/or on the hosting blade 101, adjusting the flow around the hosting blade 101, and/or converted into mechanical or electrical energy. As outlined above, each fluid routing device 103 is placed so that its inlet is at the lateral edge of the hosting blades 101. The stagnation pressure at the lateral edge, the tip of the rotating blade, is relatively high. For example, a rotating machine with a largest Radius R [m], rotating at $\omega$ [Rad/s] at a wind velocity U, the relative wind magnitude to the tip is $V=\sqrt{\omega^2 R^2 + U^2}$, resulting in a stagnation pressure of $P=\frac{1}{2}\rho V^2$ [Pa]. It should be noted that the rotor 100 may be a wind turbine, such as a vertical axis wind turbine (VAWT), for example as shown at FIG. 2 or a horizontal axis wind turbine (HAWT), for example as shown at FIG. 3. It should be noted that when the rotor is of a VAWT, the fluid routing device 401 may be mounted on the low lateral edge of the one of the blades which is parallel to the central pole. The rotor 100 may also be a set of rotating blades of a helicopter, a set of rotating blades of a gas generator, a tail rotor of a helicopter, a propeller of a ship or any other hydro-machine generator and the like.

Figure 4:
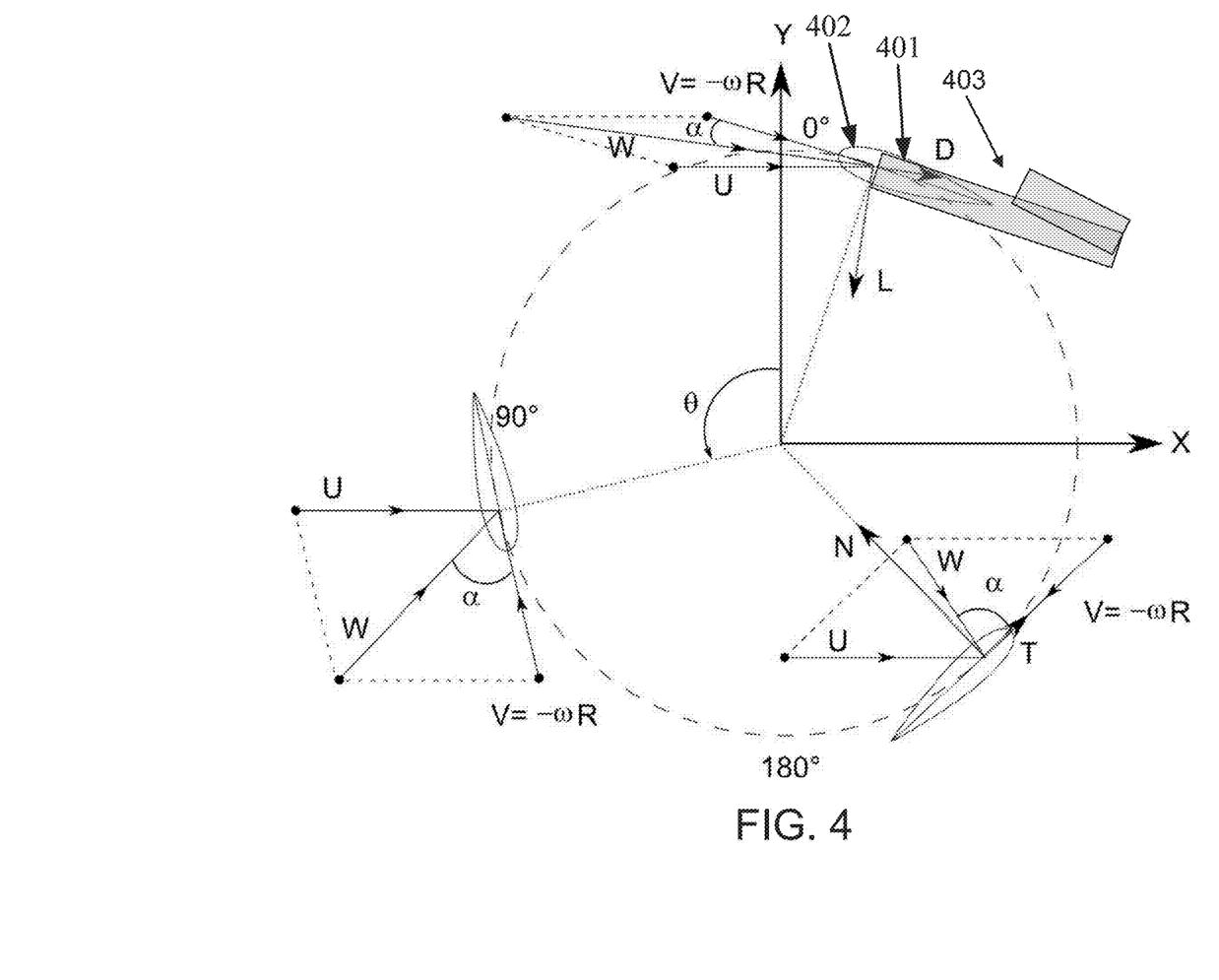
FIG. 4 is a top view schematic illustration of a VAWT having a fluid routing device mounted on the low lateral edge or the top lateral edge of one of its blades, according to some embodiments of the present invention.

For example, FIG. 4 is a top view schematic illustration of a VAWT having a fluid routing device 401 mounted on the low lateral edge or the top lateral edge of one of its blades 402, according to some embodiments of the present invention. The fluid routing device 401 is defined as outlined above and described below. When the blades rotate, air flow enters an inlet 403 of the fluid routing device 401 and redirected into or onto the hosting blade 402 for example for flow control, cleaning, heating and/or cooling purposes. Note that both the radial location and the circumferential location of the inlet could be varied. In FIG. 4, R denotes the radius of a circle formed by the rotation of the blades, around the central pole of the turbine, $\theta$ denotes the angle between blade holders, D and L denote the drag and lift forces, respectively, along and normal to the total velocity, W denotes a respective direction, the N denotes the force normal to the blade chord, U denotes the wind velocity, and W denotes the total velocity with respect to the blade.

Optionally, the inlet 403 of the fluid routing device 401 is placed on the leading segment of the lateral edge of the hosting blade 402. Optionally, the inlet 403 of the fluid routing device 401 is placed on the tailing segment of the lateral edge of the hosting blade 402. Optionally, the inlet 403 of the fluid routing device 401 has an adjustable portion that allows shifting its tip from the leading segment of the lateral edge to the tailing segment of the lateral edge and vice versa. This allows forming a phase shift to increase the stagnation press at the tip. For example, on VAWT, where the flow starts to separate for $\theta > 10°$ but the stagnation pressure maximizes at $\theta = 0°$.

Optionally, the fluid routing device 401 directs the fluid to a cooling element, such as a film cooling element. In film cooling, the conducted fluid is ducted to internal chambers of the hosting blade 402 and discharged through small holes on the surface of the hosting blade 402. This air provides a thin, cool, insulating blanket along the external surface of the hosting blade, which is optionally a turbine blade. Additionally or alternatively, the fluid routing device 401 directs the fluid toward flow control elements, such as flaps on the surface of the hosting blade 402 and/or internal channels. The flow control elements and/or film cooling elements may have different slots and/or holes at various orientations, widths, numbers and/or configurations, for example as known in the art.

Figure 5:
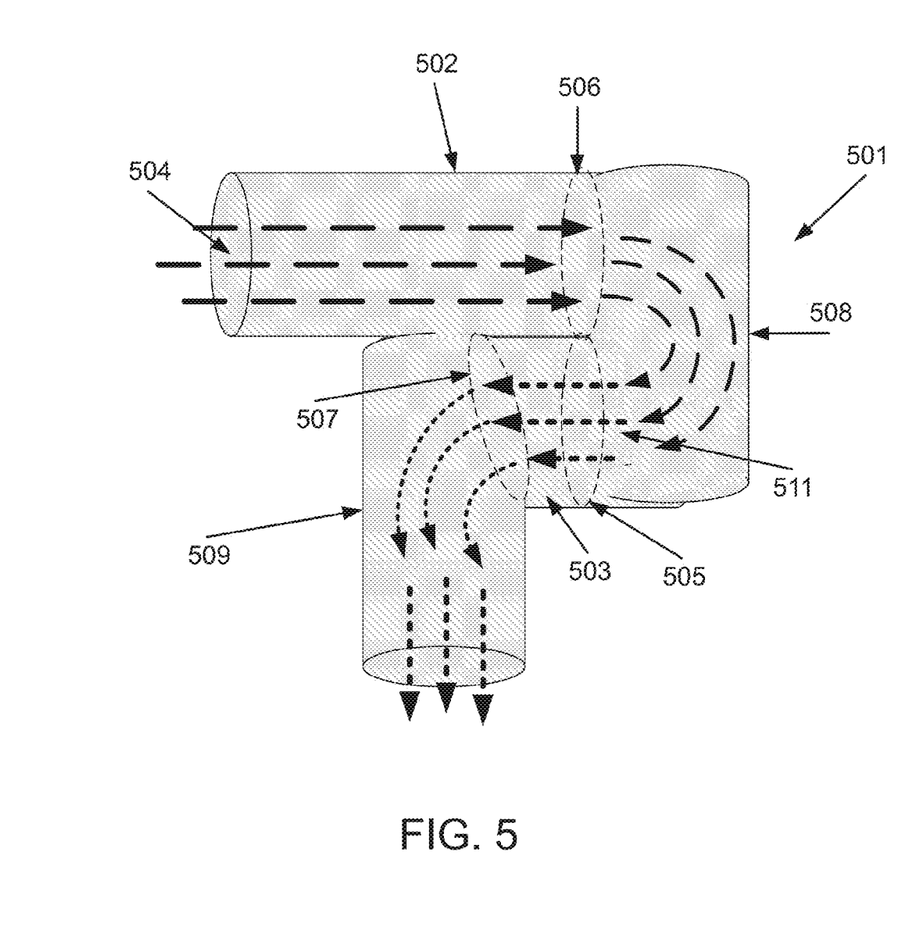
FIG. 5 is a schematic illustration of an exemplary fluid routing device, according to some embodiments of the present invention.

Reference is now made to FIG. 5, which is a schematic illustration of an exemplary fluid routing device 501, according to some embodiments of the present invention. Optionally, as shown at FIG. 5, the exemplary fluid routing device 501 does not have any moving parts. The fluid routing device 501 has two fluids conduits, referred to herein as first and second tubular members 502, 503. Each one of the fluids conduits 502, 503 defines a fluid channel and has an inlet 504, 505 and a fluid outlet 506, 507. Inlet 504 is also the inlet of the fluid routing device 501. The tubular members 502, 503 are connected to form a continuous bended fluid channel. Diameter of the tubular members 502, 503 may be between 1 millimeter (mm) and 1 meter (m).

Optionally, a bend connector 508 connects the outlet 506 of the first tubular member 506 and the inlet 505 of the second tubular member 505 to form a continuous fluid channel which passes via the fluid channels of both tubular members 502, 503. The intersection between the tubular members in the bend connector 508 functions as a compressor for altering the static pressure of the fluid flowing via the inlet 504, for example compressing. Optionally, the bend connector 508 is welded to the tubular members 502, 503, adhered to the tubular members 502, 503, and/or integrally formed with the fluid channels in the fluid routing device 501. For example, the fluid routing device 501 may be molded as a single piece. Optionally, the bend connector 508 connects the tubular members 502, 503 so that an acute angle is formed in between.

Figure 6A:
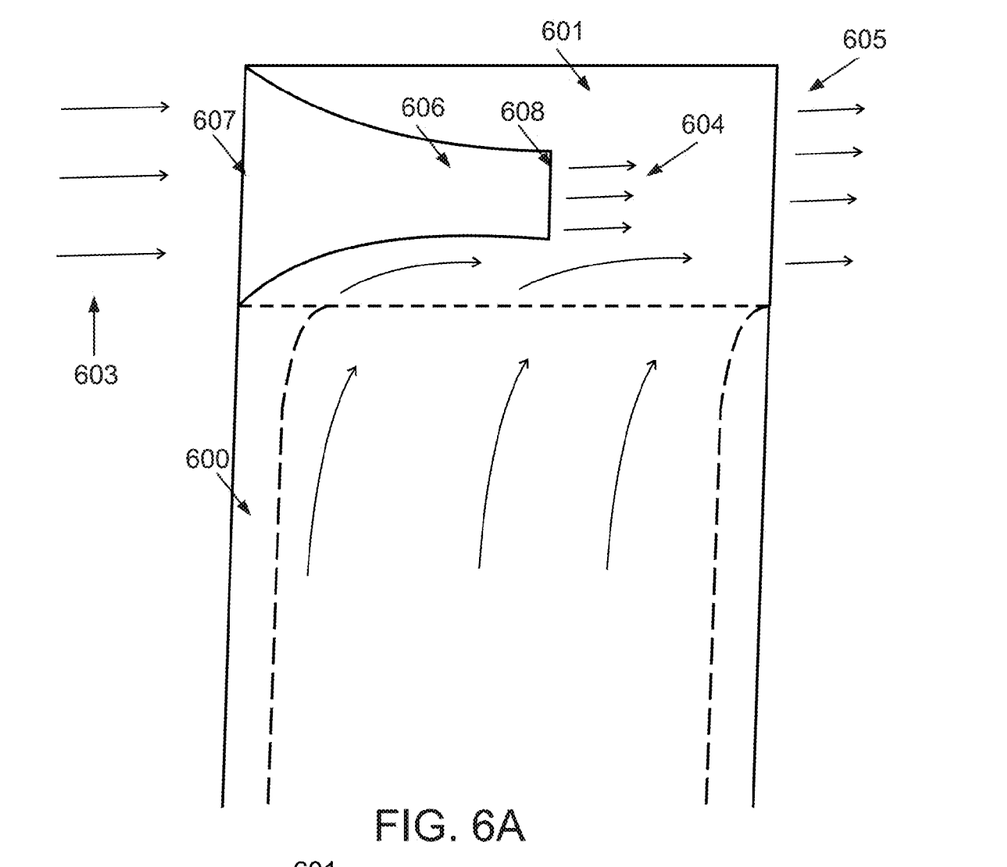
FIGS. 6A and 6B are lateral and frontal schematic illustrations of an exemplary fluid routing device which functions as an ejector for forming suction flow, according to some embodiments of the present invention.
Figure 6B:
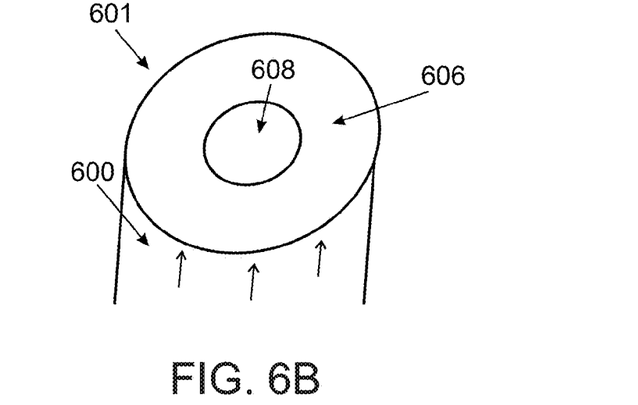

As shown at 509, the fluid routing device 501 further comprises a flow directing element, such as a bended joint, one or more flaps and/or a bended channel, which is connected to the outlet 507 of the second tubular members 503 and set to direct the fluid, which is optionally compressed, for the use of a respective hosting blade. For example, the flow directing element 509 directs the fluid to an axis that is substantially perpendicular to the central axis of the tubular member 502. In such a manner, the fluid routing device 501 may be attached to the lateral edge of a blade, such as a blade, as shown at FIGS. 2 and 3, so that the end of the inlet 504 is substantially parallel to the leading edge of the hosting blade. In another example, the fluid is conducted to form a sub-ambient (external) pressure that draws air from the external surface of a respective blade, for example as depicted in FIG. 6 and described below.

Optionally, the fluid routing device 501 is installed onto the lateral edge of a blade so that the flow directing element 509 directs fluid 511 into one or more cavities or fluid channels formed in the blade.

Optionally, the fluid routing device 501 is installed onto the lateral edge of a blade so that the flow directing element 509 directs fluid 511 onto the external surface of the blade.

Optionally, the fluid routing device 501 is installed onto the lateral edge of a blade so that the flow directing element 509 directs fluid 511 onto an energy converting element on the external surface of the blade.

The inlet 503 is placed in a region where the stagnation pressure is high and where less disturbances to the hosting blade take place. This increases performances of the wind turbine blade.

Optionally, an oscillatory flow is formed at the inlet 504 and/or at openings of excitation locations spread along the hosting blade for increasing the efficiency of the flow control in relation to the flow control that is generated only by a steady blowing and/or steady suction, for example (e.g. via fluidic oscillator or a rotating drum).

According to some embodiments of the present invention, additionally or alternatively to the functions of the fluid routing device 501 which are described above, the fluid routing device 501 which is attached to the tip of the blade 101 is configured for generating a suction pressure that draws fluid from the volume of the blade and/or optionally from its external, for example using suction ports.

Optionally, the fluid routing device 501 functions as an ejector so as to increase the suction flow. For example, the fluid routing device 501 functions as the ejector is defined as described in WO2008/135967, published on Nov. 13, 2008 which is incorporated herein By Reference.

For example, reference is now also made to FIGS. 6A and 6B which are lateral and frontal schematic illustrations of an exemplary fluid routing device 601 which functions as an ejector that is attached to the tip of a blade 600, according to some embodiments of the present invention. The ejector 601 optionally has a truncated conical structure 606 with an open base 607 and an open top 609. The ejector 601 converts captured fluid 603 to a suction flow 604 that attracts the fluid in the blade's lumen by forming entrained flow 604 in the blade's lumen and directs the entrained flow outside 605 of the blade 600.

According to some embodiments of the present invention, the fluid routing device 501 is an add-on that is set to be attached to the lateral ends of blades of an existing rotor, such as an existing wind turbine. Such an add-on, which optionally does not require an energy source, may be installed without wiring that require routing electricity from the hub (shaft) and therefore does not require momentum reducing slip rings and/or forming flow ducts and/or reducing the angular momentum of the hosting blades. According to some embodiments of the present invention, the fluid routing device 501 is integrally formed in the lateral edge of a blade of rotor.

It is expected that during the life of a patent maturing from this application many relevant systems and methods will be developed and the scope of the term fluid routing and rotor is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A rotor, comprising:
  a plurality of blades; and
  a plurality of fluid routing devices, each mechanically connected to one of said plurality of blades and comprises:
  a continuous channel with an inlet having a tip, and facing the opposite direction of rotation of said plurality of blades and an outlet, said continuous channel conducts fluid passing via said inlet and said inlet being placed in a lateral edge of said one of said plurality of blades, and
  a flow directing element mechanically connected to said outlet so as to direct said conducted fluid into a duct inside said one of said plurality of blades to adjust a fluid flow in or on said blade;

wherein the inlet of each one of the plurality of fluid routing devices having an adjustable portion that shifts its tip in direction of the plane of said one of said plurality of blades when fluid flows via said inlet tip so that a phase shift is formed in an angle, a, between a leading segment of said one of said plurality of blades and said inlet tip, said phase shift increases a stagnation pressure as compared to that prevailing at the leading segment of said lateral edge.

2. The rotor of claim 1, wherein said continuous channel is sized and shaped to conduct said passing fluid.

3. The rotor of claim 1, wherein said flow directing element directs said conducted fluid toward said one of said plurality of blades.

4. The rotor of claim 1, wherein said flow directing element applies suction pressure on fluid in said one of said plurality of blades.

5. The rotor of claim 1, wherein said flow directing element directs said conducted fluid to a longitudinal axis of said one of said plurality of blades.

6. The rotor of claim 1, wherein said flow directing element supports a pumping mechanism of said rotor.

7. The rotor of claim 1, wherein said continuous channel comprises:
a first tubular member defining a first fluid channel originating from said inlet,
a second tubular member defining a second fluid channel terminating at said outlet, and
a bend connector which connects between said first and second fluid channels so as to form a continuous fluid channel therealong and an acute angle therebetween for conducting fluid passing via said inlet.

8. The rotor device of claim 1, wherein said flow directing element directs said conducted fluid to a longitudinal axis of said one of said plurality of blades.

9. The rotor of claim 1, wherein said flow directing element does not have any moving parts.

10. The rotor of claim 1, wherein said continuous channel having a bend connector which turns a flowing direction of said fluid flow towards said flow directing element.

11. The rotor of claim 1, wherein said inlet and said outlet are facing perpendicular directions.

12. The rotor of claim 1, wherein said rotor is a vertical axis wind turbine (VAWT).

* * * * *